June 25, 1957  E. C. CARLSON  2,796,720
RECIPROCATING CUTTING ASSEMBLY WITH COUNTERBALANCED DRIVE
Filed June 25, 1954  4 Sheets-Sheet 2
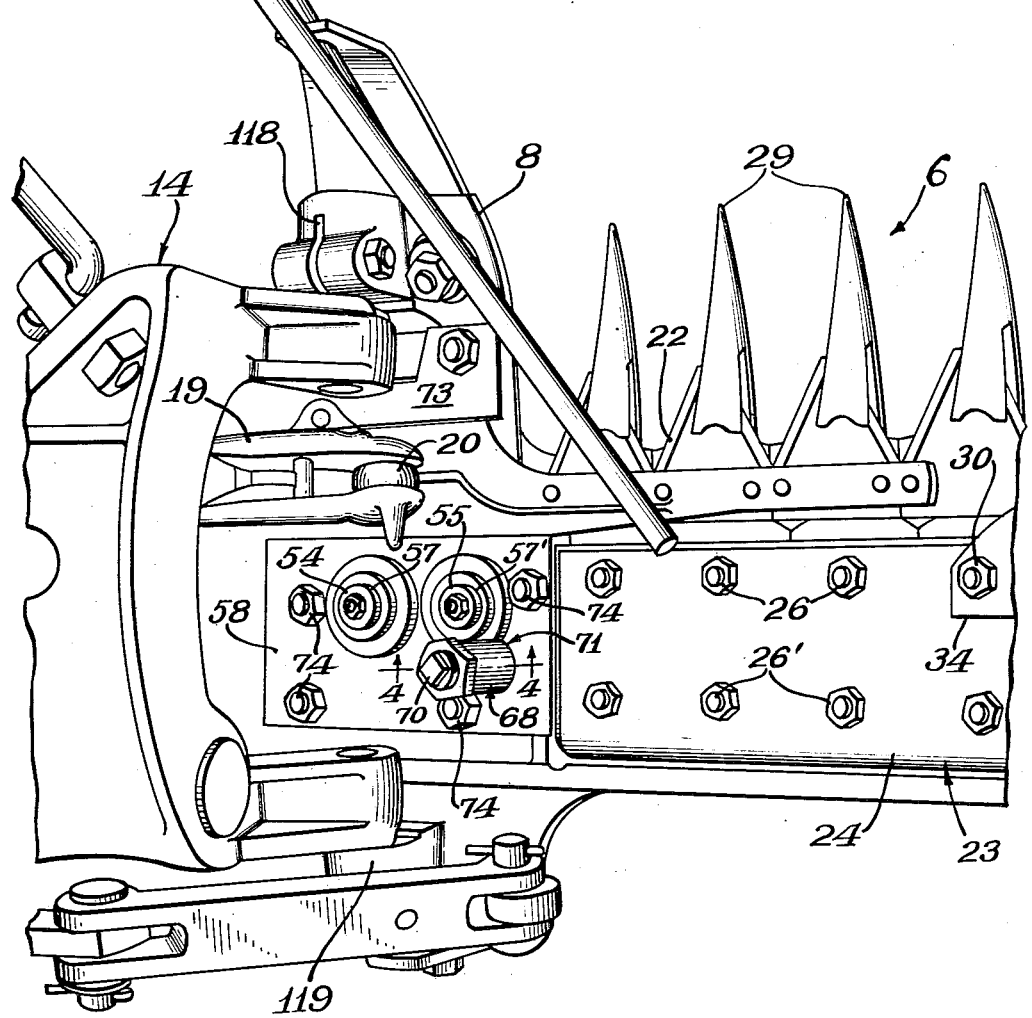
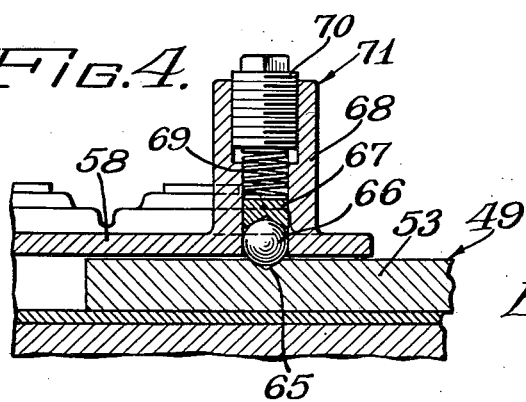
Inventor:
Ernest C. Carlson

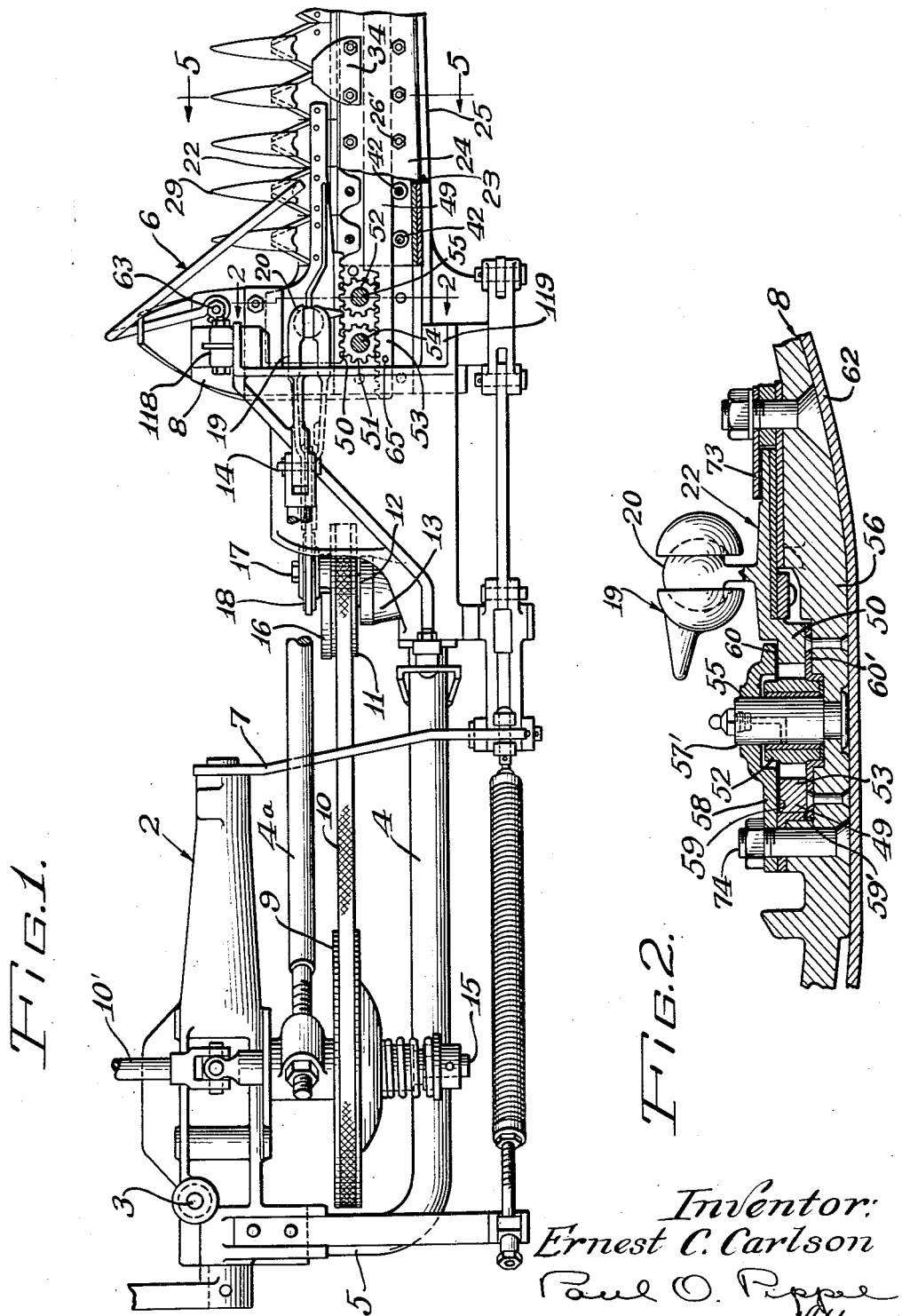

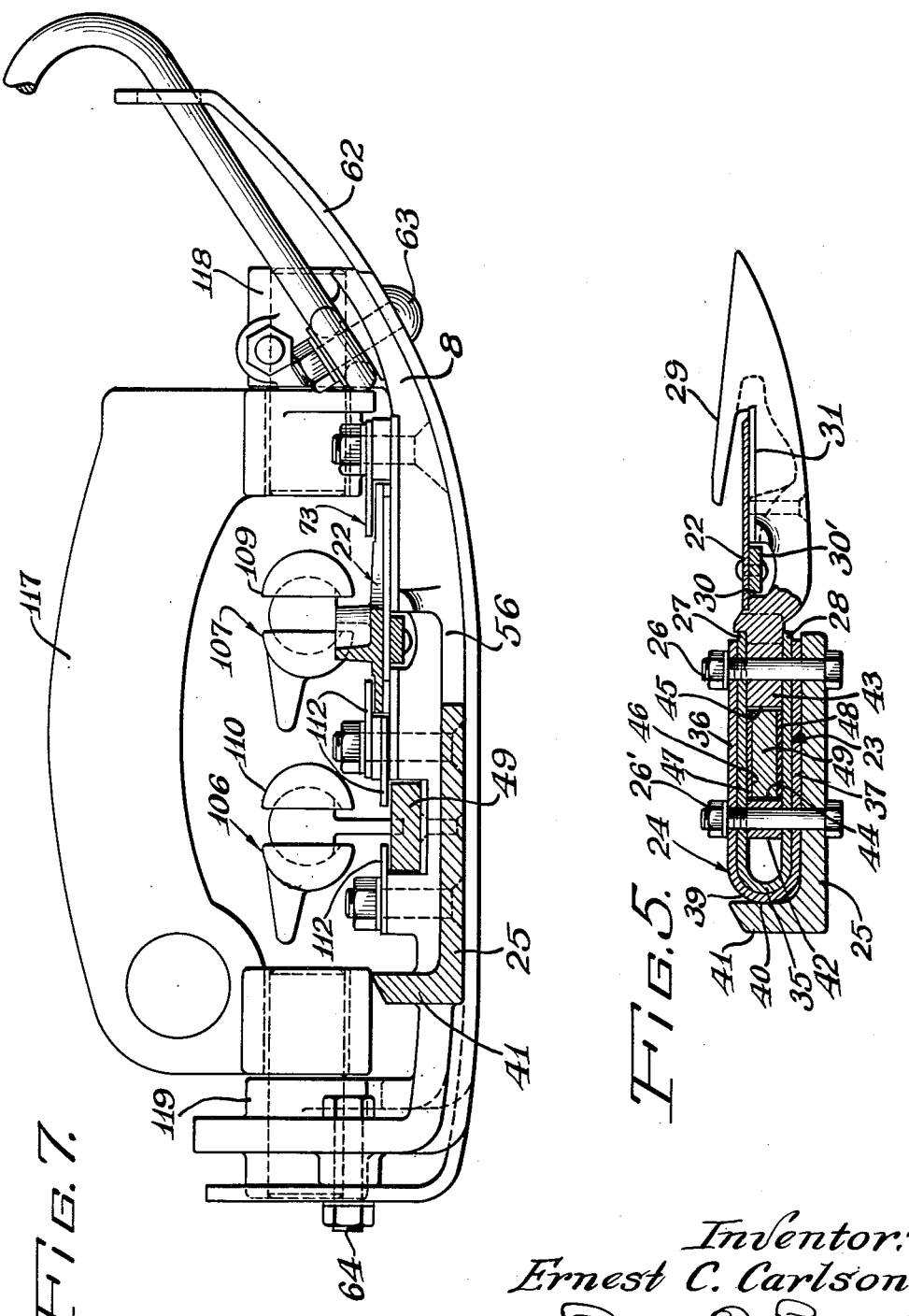

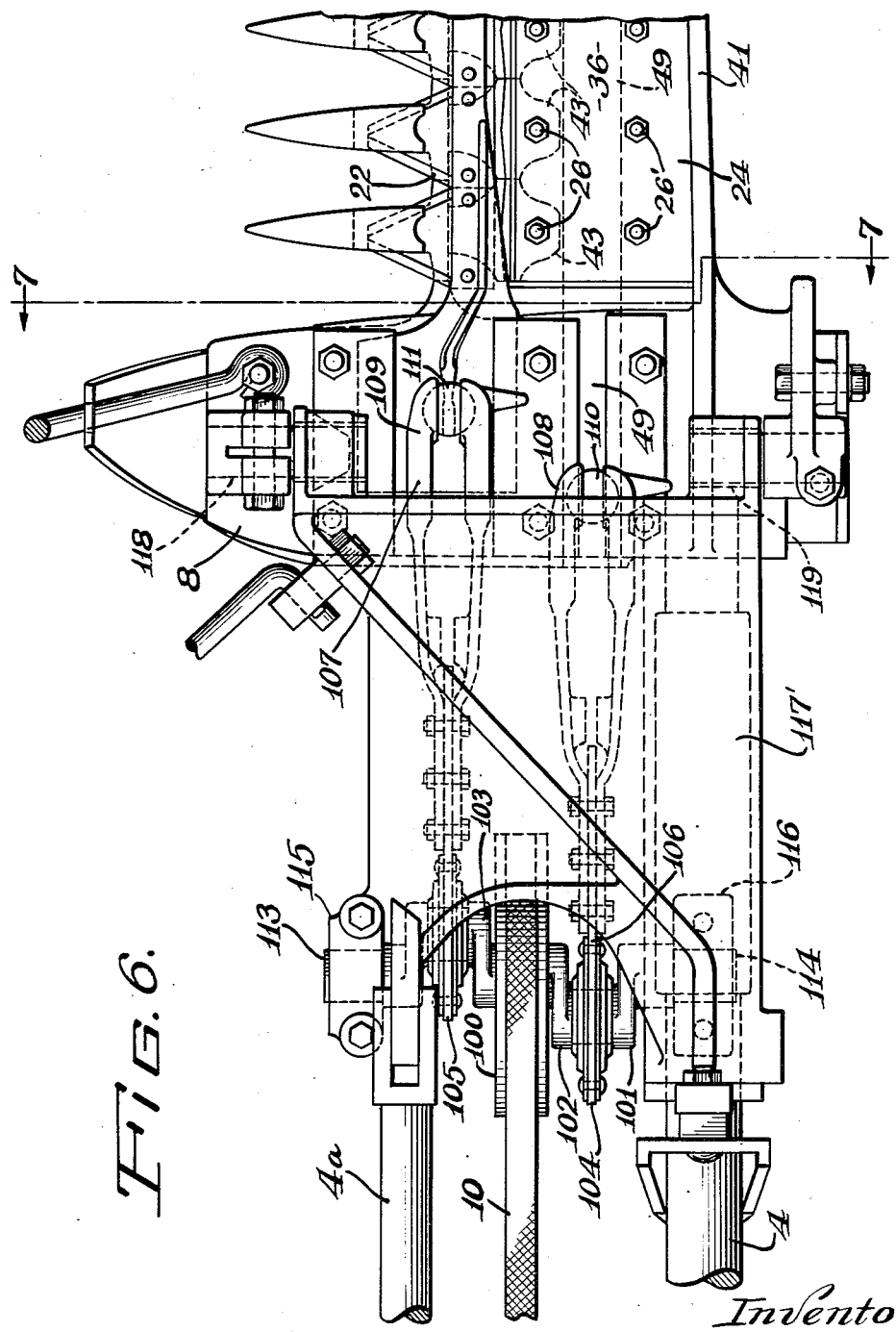

United States Patent Office 2,796,720
Patented June 25, 1957

2,796,720

RECIPROCATING CUTTING ASSEMBLY WITH COUNTERBALANCED DRIVE

Ernest C. Carlson, Wheaton, Ill., assignor to International Harvester Company, a corporation of New Jersey Application June 25, 1954, Serial No. 439,182

9 Claims. (Cl. 56—306)

This invention relates to sickle drive mechanism for harvesters and more directly to novel and improved drive means in which the inertia forces created by reciprocation of the sickle are balanced against inertia forces created in opposition to those of the sickle by a counterreciprocating weight.

Particularly in harvesters such as mowers which are relatively of light weight and connected to an associated tractor by a skeletal framework, the problem of vibrations generated by reciprocation of the sickle presents a serious objection in that in order to provide for reasonably useful life for the structure, the same must be excessively strengthened and braced in order to avoid premature failures.

In realizing a solution for the elimination of these destructive vibrations, it is necessary to consider cost, the adaptability of the new construction for use in conventional structure, simplicity, as well as the efficiency and the results obtained.

Inasmuch as the high speed, short stroke reciprocation of the sickle develops a high amplitude and a high frequency vibration period, it will be readily appreciated that the counterbalance must be exactly responsive in order to provide the requisite counterbalance.

The general object of the invention is to provide a novel counterbalance for the reciprocating sickle in the form of a counterweight mounted for reciprocation in alternate strokes in opposition to the reciprocating strokes of the sickle.

A more specific object of the invention is to dispose the counterweight substantially in the plane of the reciprocating sickle.

A further object of the invention is to utilize the conventional sickle drive principles so that it may be readily incorporated into harvesters of conventional design.

A different object of the invention is to provide a novel and simple drive arrangement for reciprocating the sickle and the counterweight simultaneously in opposite and counter-balancing relationship.

These and other objects of the invention become more apparent from the specification and drawings wherein:

Figure 1 is a fragmentary plan view of a mower support structure and a mower carried thereby and illustrating the invention associated therewith with the parts removed and broken away in order to more clearly illustrate the invention;

Figure 2 is an enlarged transverse vertical sectional view taken substantially on the line 2—2 of Figure 1;

Figure 3 is an enlarged fragmentary perspective view looking downwardly inwardly from the outer end of the mower;

Figure 4 is an enlarged fragmentary longitudinal sectional view of the interclocking mechanism taken substantially on the line 4—4 of Figure 3, and Figure 5 is an enlarged transverse vertical sectional view taken substantially on the line 5—5 of Figure 1.

Figures 6 and 7 illustrate a further modification of the invention, Figure 6 being a fragmentary plan view and Figure 7 being a transverse vertical sectional view taken substantially in the planes indicated by the line 7—7 of Figure 6.

Although the principles of the invention are applicable to harvesters in general, the preferred embodiment is disclosed as primarily for use in a mower, and for the purposes of clarity and brevity in the description, reference will be had to harvester structure as exemplified by a mower.

The harvester support frame work generally designated 2 is of conventional design adapted for pivotal mounting at 3 on the tractor drawbar as will be readily understood by those skilled in the art. The harvester framework further includes a coupling arm 4 which has a fore and aft extending stub axle end 5 pivotally connected to the structure 2 on a generally horizontal axis and accommodating lifting and lowering of the mower generally designated 6 by means of the lifting assembly 7 which is connected to the inner shoe 8 of the mower 6 in conventional manner. The frame structure 2 rotatably supports a driving pulley 9 which is driven through a knuckle shaft 10' from the power take-off of the tractor, the pulley 9 driving a belt 10 trained thereabout and about a pulley 11 which is journalled on a shaft 12 disposed on an axis transverse to the line of reciprocation of the mower sickle and carried within a bearing 13 formed integral with the inserted U-shaped yoke 14 connected to the outer ends of the coupling arm 4 and stabilizing pad 4a. The shaft 12 is positioned on an axis generally parallel to the shaft 15 supporting the driving pulley 9. The driven pulley 11 has a counterweight at 16 to counterbalance the crankpin 17 located diametrically opposite to the counterweight 16 on pulley 11 and the pin 17 is rotatably connected to one end 18 of a pitman 19, the other end of which has a ball joint connection at 20 to one end of a sickle member 22 which is reciprocably mounted on a cutter bar 23 of the mower 6.

The cutter bar 23 of the present invention is U-shaped in cross section as best seen in Figure 5 and is telescoped within a complementary reinforcing and mounting sheath member 24 which extends over the inner end portion of the sheath bar 23 and seats on a laterally outwardly extending mounting plate portion 25 formed integral with the inner shoe 8 and bolted thereto and to the cutter bar 23 as by a plurality of front and rear rows of bolts 26, 26'. It will be seen from a consideration of Figure 5 that the U-shaped cutter bar 23 comprises top and bottom substantially parallel webs 27 and 28 which at their forward ends are also connected with forwardly projecting finger members 29 by the bolts 26, said finger members 29 each mounting a ledger plate 31 which is disposed in shearing relationship with the sickle 22 in the conventional manner and each having a transverse slot 30 ahead of the forward edge of the bar 23 forming a channel guiding the sickle backing bar 30' therein. It will be appreciated that certain of the bolts 26 interconnecting the finger members with the cutter bar also provide connections for holddown clips 34 of conventional design as shown in Figure 1. It will be seen from a consideration of Figure 5 that the rear ends of the top and bottom webs 27, 28 of the sheath bar 23 are interconnected by an arcuate rear wall 35 and that the top and bottom webs 27, 28 of the cutter bar are received between the top and bottom walls 36 and 37 of the mounting sheath 24 and the walls 36 and 37 are interconnected by a rear arcuate wall 39 which at its rear edge seats as at 40 against an upturned ledge 41 on the rear edge of the mounting plate portion 25 which underlies the bottom wall 37 of the mounting sheath 24.

The top and bottom webs 27, 28 of the sheath bar are maintained in parallel vertically spaced relationship by means of separator bearings 42 aligned longitudinally of the cutter bar ahead of the rear wall 35 of the sheath bar and held in place by the rear row of bolts 26' and the forward ends of the webs 27 and 28 are maintained separated by means of the heel portions or mounting lugs 43 of the finger members 29. It will be appreciated that the forward sides 44 of the separator guides 42 and the rear edges 45 (Fig. 5) of the heel portions of the finger members define substantially vertical generally parallel opposed edges of a longitudinal slot 46 in the sheath bar 23 and the said rectangular slot or guideway 46 being lined on its upper and lower sides with top and bottom bearing members 47 and 48 connected preferably as by brazing or welding to the top and bottom webs 27 and 28 of the sheath bar and said bearing members 47 and 48 embracing the counterbalancing weight or bar 49 therebetween, said bar being guided between the opposed surfaces 44—45 along its fore and aft lateral edges. It will be understood that the weight of the bar or slide member 49 is identical to that of the sickle mass which includes the sickle 22 and the pitman 19 and the connections therebetween.

It will be observed from the consideration of Figures 1 and 2 that the inner end of the sickle is provided along its rear edge with a rack 50 which meshes with one or forward side of a pair of pinions or drive means 51 and 52 disposed substantially coplanar with the plane of reciprocation of the sickle and the pinion gears engage or mesh at their diametrically opposite or rear side with a rack 53 which is formed integral with the inner end of the counterweight bar 49. It will also be noted that the bar 49 and the sickle 22 are substantially coplanar.

It will be noted from the consideration of Figures 1 and 2 that the pinions 51 and 52 are journalled on an upstanding stub shaft 54 and 55 which at their lower ends are riveted or otherwise secured to the base plate portion 56 of the inner shoe generally designated 8. It will be seen that the upper ends of the shafts 54 and 55 project through apertures 57, 57' (Fig. 3) in a cover plate 58 bolted over the gears 51 and 52 and the inner end portion of the counterweight 49. The plate 58 provides downwardly facing bearing area 59 and 60 respectively positioned over the rack portions 53 and 50 which are respectively in guided engagement with bearing liners 59', 60' underlying the racks 53 and 50 and riveted to the base portion 56 of the inner shoe 8.

It will be seen from a consideration of Figure 2 that the inner shoe 8 is provided with a sole plate portion 62 which as best seen in Figure 7 is connected as by bolts 63 and 64 to said inner shoe.

Operation of the device

In operation it will be readily apparent that reciprocation of the sickle moves the rack 50 associated therewith which in turn rotates the pinions which actuate the rack 53 in the opposite sense or direction to the sickle and thereby effecting a dynamic balance. To maintain the sickle and the counterweight in correct relationship with each other upon disassembly and assembly of the sickle with the cutter bar, the rack portion 53 of the counterweight is provided with a socket or detent 65 (Fig. 4) which receives a ball or interlock 66 spring pressed thereinto by a follower 67 which with the ball is received within an upright tubular holder 68 formed integral with the cover plate 58, said holder 68 being open at the bottom and also receiving a compression spring 69 which is compressed between the top side of the follower 67 and the underside of an adjustable combination retaining and abutment member 70 in the form of a plug threaded into the upper end of the holder 68. It will be understood that the position of the cavity 65 and of the releasable interlocking assembly generally designated 71 is so disposed that when the cutter bar 22 is removed by withdrawing it through the yoke member whereupon the pinions are caused to rotate in a counterclockwise direction as seen in Figure 1 and consequently moving the counterweight 49 to the right, Figure 1, that upon the last tooth of the rack 50 disengaging from the pinion 51 the rack bar 53 is so positioned that the socket 65 is in vertical alignment with the detent 66 and so releasably held in place so that upon reinsertion of the cutter bar and engagement of the said last tooth (which now is the first tooth) with the pinion 51 the same will actuate the rack 53 and release the bar 49. Thus it will be readily apparent that the two members 22 and 49 will be properly phased which in the instant arrangement is 180° apart. The location of the interlock is beyond the normal end of the outward stroke of the slide bar 49.

It will be observed from a consideration of Figure 2 that the inner end of the knife or sickle is guided along its forward edge by the guide plate dovetail arrangement 73 which is adjustably connected to the base member 56 of the shoe 8. It will also be observed that the cover plate is connected with the base member 56 by means of a plurality of bolts 74.

Referring now to Figures 6 and 7 wherein another embodiment of the invention is illustrated, parts which are identical with those of the previous embodiment will be identified by the same reference numerals.

It will be noted that the coupling bar 4 and the stabilizing bar 4a are the same as in the previous construction and that the drive transmitting belt 10 is turned about and drives a driving pulley 100 which is disposed in a substantially vertical plane substantially medially between the counterweight 49 and the sickle 22. The pulley 100 is keyed to a rotary member or double crank generally indicated 101 disposed on an axis tranverse to the line of reciprocation of the sickle and having a pair of throws 102 and 103 separated 180° apart from each other and drivingly connected to the inner ends 104 and 105 of pitmans 106 and 107 which at their outer ends 108 and 109 have ball joint connections at 110 at 111 with the counterweight 49 and the sickle 22. It will be understood that the sickle is guided substantially similarly as in the previous embodiment and that the member 49 is guided by dovetail assemblies 112 connected to the shoe 8. The double crank has journal end portions 113 and 114 in bearings 115 and 116 on the yoke member 117' which is substantially similar to that of the previous embodiment being an inverted U, with the exception that it provides for the double bearings. It will be noted that in each embodiment the inner shoe structure is pivotally connected as at 118 and 119 to the yoke by means providing for vertical pivotal movement of the cutter bar on a substantially horizontal fore and aft extending axis.

In this embodiment the counterweight and the sickle are simultaneously reciprocated in opposite directions by the rotary member 101 to provide a dynamic balance.

What is claimed is:

1. For a harvester having a support and a cutter bar including a sickle member reciprocable thereon; said cutter bar comprising a hollow element providing a guideway generally coplanar with the plane of said sickle member and substantially parallel to the line of reciprocation of the sickle member, a counterweight bar member reciprocally mounted in said guideway, opposed racks on said sickle member and said counterweight bar member, a pinion rotatably journalled on said cutter bar generally coplanar with said sickle member and counterweight bar member between said racks and in meshing engagement therewith, means mounting said cutter bar on said support, and drive means for reciprocating one of said members and operatively connected thereto.

2. The combination according to claim 1 and said drive means comprising a rotary part journalled on said support on an axis transverse to the line of reciprocation of the sickle member, a crank embodied in said rotary part, and a pitman interconnecting said crank with said one member.

3. For a harvesting having a support and a cutter bar including a sickle reciprocable thereon on a line lengthwise thereof; sickle drive mechanism, comprising a rotary part journalled on the support on an axis transverse to the line of reciprocation of the sickle; a reciprocating slide member carried by the carrier for reciprocation along a line paralleling the line of reciprocation of the sickle; drive means connecting the rotary driving part and said sickle for reciprocating the latter; opposed racks on said sickle and said bar, and a meshing pinion therebetween for driving said slide member in response to movement of and in an opposite sense to said sickle and in preset phased relationship thereto.

4. The invention according to claim 3 and said sickle and slide member disposed in a substantially common plane and in transverse alignment with each other and said pinion positioned substantially coplanar with said slide member and sickle.

5. The combination according to claim 3, and means for releasably locking said bar for maintaining the same in phased relation to said sickle upon assembly and disassembly of said sickle as respects said cutter bar and comprising cooperative releasable interlocking means on said slide bar and said cutter bar and positioned for interlocking engagement with said bar upon removal of said sickle, said interlocking means disengageable attendant to replacement of said sickle.

6. For a device of the class described comprising a cutter bar and a sickle reciprocable thereon; a counterweight slide member reciprocably supported on said cutter bar, opposed racks on said sickle and said slide member, and at least one pinion rotatably mounted upon said cutter bar and in meshing engagement at diametrically opposite sides with respective racks.

7. The combination according to claim 6 and said pinion coupling said slide bar and said sickle at a straight angle out of phase with each other, said sickle being removable endwise with respect to said cutter bar whereby rotating said pinion until the rack of said sickle is disengaged and concomitantly moving said slide bar in the opposite direction, and releasable cooperative interlocking means on said cutter bar and said slide bar for holding said slide bar in the position whereat it has been moved when said sickle has been removed, said means releasable attendant to replacement of said cutter bar with endwise movement thereof engaging its rack with said pinion.

8. The combination according to claim 7 and said interlocking means comprising a depression in said slide bar, and a spring pressed ball carried on the cutter bar and enterable into said depression in said position of said slide bar.

9. For a harvester having a cutter bar and a sickle member reciprocal thereon; a counterweight member slidably supported upon the cutter bar for movement in a plane generally parallel to said sickle member; drive means for reciprocating one of said members operatively connected thereto, and drive transmitting means operatively interconnecting said one member with the other member for moving said other member in the opposite direction and in response to movement of said one member and including a shaft carried by the cutter bar and extending axially transversely of said plane, and a rigid element rotatively mounted at one point upon said shaft and drivingly connected at opposite sides of said point with the respective members.

References Cited in the file of this patent

UNITED STATES PATENTS

| | | |
|---|---|---|
| 34,181 | Emerson et al. | Jan. 14, 1862 |
| 129,357 | Newes | July 16, 1872 |
| 195,907 | Thomson | Oct. 9, 1877 |
| 536,924 | Dorney | Apr. 2, 1895 |
| 834,969 | Clarkson | Nov. 6, 1906 |
| 1,017,863 | Fulton | Feb. 20, 1912 |
| 1,532,358 | Weidemann | Apr. 7, 1925 |
| 2,246,943 | Jones | June 24, 1941 |
| 2,345,383 | Curtis | Mar. 28, 1944 |